United States Patent
Shanmugam et al.

(10) Patent No.: US 11,157,563 B2
(45) Date of Patent: Oct. 26, 2021

(54) SYSTEM FOR MONITORING LOWER LEVEL ENVIRONMENT FOR UNSANITIZED DATA

(71) Applicant: Bank of America Corporation, Charlotte, NC (US)

(72) Inventors: Parthiban T. Shanmugam, Charlotte, NC (US); Bayyareddy Sreenivasulu Reddy, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 281 days.

(21) Appl. No.: 16/035,345

(22) Filed: Jul. 13, 2018

(65) Prior Publication Data
US 2020/0019648 A1 Jan. 16, 2020

(51) Int. Cl.
| G06F 16/00 | (2019.01) |
| G06F 16/903 | (2019.01) |
| G06F 11/30 | (2006.01) |
| G06F 11/07 | (2006.01) |
| G06F 16/9038 | (2019.01) |
| G06F 16/30 | (2019.01) |

(52) U.S. Cl.
CPC ...... *G06F 16/90335* (2019.01); *G06F 11/079* (2013.01); *G06F 11/3089* (2013.01); *G06F 16/9038* (2019.01)

(58) Field of Classification Search
None
See application file for complete search history.

(56) References Cited

U.S. PATENT DOCUMENTS

| 5,918,035 | A | 6/1999 | Van Praet et al. |
| 7,603,653 | B2 | 10/2009 | Sundararajan et al. |
| 7,865,461 | B1 * | 1/2011 | Best .................. G06F 16/254 707/610 |
| 8,336,026 | B2 | 12/2012 | Chaar et al. |
| 8,375,370 | B2 | 2/2013 | Chaar et al. |
| 8,407,073 | B2 | 3/2013 | Bagheri et al. |
| 8,418,126 | B2 | 4/2013 | Chaar et al. |
| 9,298,941 | B2 * | 3/2016 | Stofberg .......... G06F 11/1453 |
| 9,703,974 | B1 * | 7/2017 | Surkatty .......... G06F 21/6218 |
| 9,846,716 | B1 * | 12/2017 | Scott .............. G06F 21/6245 |
| 10,325,099 | B2 * | 6/2019 | Cook ............... G06F 21/6254 |
| 10,671,753 | B2 * | 6/2020 | Allen .............. G06F 21/6263 |
| 2003/0023950 | A1 | 1/2003 | Ma et al. |
| 2004/0064805 | A1 | 4/2004 | Sparago et al. |

(Continued)

*Primary Examiner* — Polina G Peach
(74) *Attorney, Agent, or Firm* — Michael A. Springs; Moore & Van Allen PLLC; Anup Shrinivasan Iyer (57) ABSTRACT

Systems, computer program products, and methods are described herein for monitoring lower level environment for unsanitized data. The present invention is configured to initiate a retrieval query with a first database in a lower level environment; retrieve one or more data items from the first database based on at least the retrieval query; compare the retrieved one or more data items with one or more records associated with a production environment; determine a match between the one or more data items and the one or more records based on at least the comparing; retrieve matched data based on at least determining the match; and transmit control signals configured to cause a user device associated with a user to display the matched data.

17 Claims, 2 Drawing Sheets

(56) References Cited

U.S. PATENT DOCUMENTS

| | | | |
|---|---|---|---|
| 2006/0080554 A1* | 4/2006 | McDonald | G06F 21/6254 713/189 |
| 2008/0127040 A1 | 5/2008 | Barcellona | |
| 2008/0255693 A1 | 10/2008 | Chaar et al. | |
| 2008/0255696 A1 | 10/2008 | Chaar et al. | |
| 2008/0256390 A1 | 10/2008 | Chaar et al. | |
| 2008/0256506 A1 | 10/2008 | Chaar et al. | |
| 2008/0256529 A1 | 10/2008 | Chaar et al. | |
| 2009/0043622 A1 | 2/2009 | Finlayson et al. | |
| 2009/0043631 A1 | 2/2009 | Finlayson et al. | |
| 2009/0055795 A1 | 2/2009 | Finlayson et al. | |
| 2009/0064322 A1 | 3/2009 | Finlayson et al. | |
| 2009/0132088 A1 | 5/2009 | Taitler | |
| 2009/0158441 A1* | 6/2009 | Mohler | G06F 21/552 726/27 |
| 2009/0240694 A1* | 9/2009 | Jensen | G06F 16/00 |
| 2009/0299882 A1 | 12/2009 | Erickson et al. | |
| 2009/0300586 A1 | 12/2009 | Bernardini et al. | |
| 2009/0319588 A1* | 12/2009 | Gandhi | G06F 21/6254 |
| 2010/0023918 A1 | 1/2010 | Bernardini et al. | |
| 2010/0031090 A1 | 2/2010 | Bernardini et al. | |
| 2010/0042583 A1* | 2/2010 | Gervais | G06F 21/6254 707/757 |
| 2010/0192220 A1* | 7/2010 | Heizmann | G06F 11/3664 726/19 |
| 2010/0205189 A1* | 8/2010 | Ebrahimi | G06F 21/6227 707/757 |
| 2010/0306854 A1* | 12/2010 | Neergaard | G06F 21/6254 726/26 |
| 2011/0010645 A1 | 1/2011 | Mihalcea | |
| 2011/0258206 A1* | 10/2011 | El Emam | G06F 21/6254 707/754 |
| 2011/0307856 A1 | 12/2011 | Klaka et al. | |
| 2012/0272329 A1* | 10/2012 | Grammer | G06F 21/6245 726/26 |
| 2013/0046667 A1* | 2/2013 | Hill | G06Q 40/02 705/35 |
| 2013/0167192 A1* | 6/2013 | Hickman | G06F 21/60 726/1 |
| 2014/0172806 A1* | 6/2014 | Wilding | G06F 16/24 707/693 |
| 2015/0067881 A1* | 3/2015 | Badstieber | G06F 16/13 726/26 |
| 2015/0073981 A1* | 3/2015 | Adjaoute | G06Q 30/0225 705/39 |
| 2015/0143064 A1* | 5/2015 | Bhargava | G06F 11/1451 711/162 |
| 2016/0063269 A1* | 3/2016 | Liden | G06F 21/6254 726/26 |
| 2016/0092535 A1* | 3/2016 | Kuchibhotla | G06F 16/27 707/634 |
| 2017/0357982 A1* | 12/2017 | Barday | G06Q 10/06 |
| 2018/0232528 A1* | 8/2018 | Williamson | G06F 21/6254 |
| 2018/0268135 A1* | 9/2018 | Nachenberg | G06F 21/6245 |

* cited by examiner

SYSTEM FOR MONITORING LOWER LEVEL ENVIRONMENT FOR UNSANITIZED DATA

FIELD OF THE INVENTION

The present invention embraces a system for monitoring lower level environment for unsanitized data.

BACKGROUND

The concern for information security and privacy has increased dramatically with technology advances, and the virtually ubiquitous nature of electronic communications. With this advancement, attention to data sanitization issues, practices, and procedures has become an important priority for entities. In a large scale software development environment, there is a need for monitoring lower level environments for unsanitized data.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for monitoring lower level environment for unsanitized data is presented. The system comprises at least one non-transitory storage device; and at least one processing device coupled to the at least one non-transitory storage device, wherein the at least one processing device is configured to: initiate a retrieval query with a first database in a lower level environment; retrieve one or more data items from the first database based on at least the retrieval query; compare the retrieved one or more data items with one or more records associated with a production environment; determine a match between the one or more data items and the one or more records based on at least the comparing; retrieve matched data based on at least determining the match; and transmit control signals configured to cause a user device associated with a user to display the matched data.

In some embodiments, the at least one processing device is further configured to: retrieve the one or more records from the production environment; and implement one or more sanitization algorithms on the one or more records.

In some embodiments, the at least one processing device is further configured to: identify a position of one or more restricted data items associated with the one or more records in the production environment; and implement at least one of the one or more sanitization algorithms on the position of the one or more restricted data items, thereby restricting access to the one or more records.

In some embodiments, the one or more data items in the lower level environment is sanitized and the one or more records in the production environment is unsanitized.

In some embodiments, the matched data indicates a presence of unsanitized data in the lower level environment indicating a breach.

In some embodiments, the at least one processing device is further configured to: implement a root cause analysis to determine a source of the breach, wherein implementing further comprises determining one or more devices that have accessed the first database during a predetermined past period.

In some embodiments, the at least one processing device is further configured to: generate an alert based on at least determining the match, wherein the alert comprises the matched data and the one or more devices that have accessed the first database during the predetermined past period.

In some embodiments, the at least one processing device is further configured to: receive an indication that one or more additional data items have been added to the first database in the lower level environment; initiate the retrieval query with the first database to retrieve the one or more additional data items based on at least receiving the indication that the one or more additional data items have been added to the first database; and compare the one or more additional data items to the one or more records associated with the production environment to determine the match.

In some embodiments, the at least one processing device is further configured to: automatically initiate the retrieval query with the first database in the lower level environment at predetermined periodic intervals; determine one or more data items associated with the lower level environment that were not retrieved during the retrieval query initiated in a preceding period; and compare the one or more data items that were not retrieved during the retrieval query initiated in the preceding period with the one or more records associated with the production environment to determine the match.

In another aspect, a computer implemented method for monitoring lower level environment for unsanitized data is presented. The method comprises initiate a retrieval query with a first database in a lower level environment; retrieve one or more data items from the first database based on at least the retrieval query; compare the retrieved one or more data items with one or more records associated with a production environment; determine a match between the one or more data items and the one or more records based on at least the comparing; retrieve matched data based on at least determining the match; and transmit control signals configured to cause a user device associated with a user to display the matched data.

In yet another aspect, a computer program product for monitoring lower level environment for unsanitized data is presented. The computer program product comprising a non-transitory computer-readable medium comprising code causing a first apparatus to: initiate a retrieval query with a first database in a lower level environment; retrieve one or more data items from the first database based on at least the retrieval query; compare the retrieved one or more data items with one or more records associated with a production environment; determine a match between the one or more data items and the one or more records based on at least the comparing; retrieve matched data based on at least determining the match; and transmit control signals configured to cause a user device associated with a user to display the matched data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
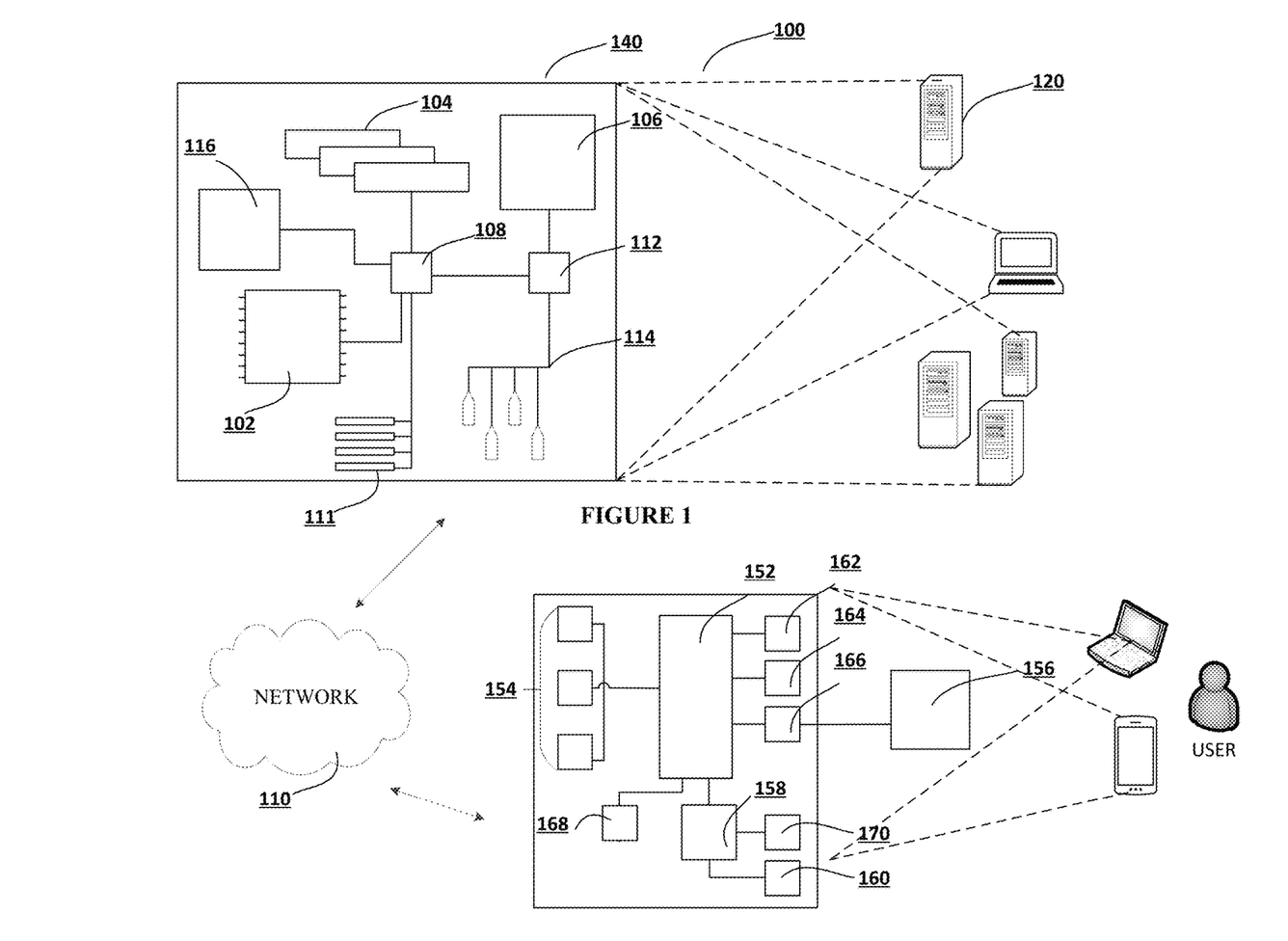
FIG. 1 illustrates technical components of a system for monitoring lower level environment for unsanitized data, in accordance with an embodiment of the invention.

FIG. 1 presents an exemplary block diagram of the system environment for monitoring lower level environment for unsanitized data 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In software deployment, an environment or tier is a computer system in which a computer program or software artifact is deployed and executed. Large entities structure their release management process to allow a phased deployment, testing, and rollback by separating the development environment (where changes are originally made) and the production environment (what end users use), often with several stages in between. The production environment may include sensitive information associated with one or more customers such as account numbers, social security numbers, contact information, or the like. Such information is typically only visible to customers who have access to the production environment or the equivalent customer facing interface associated with the software artifact. When such artifacts are subjected to amendments, they are typically moved back to a lower-level environment, such as the development environment for code rewrites or scope changes.

The concern for information security and privacy has increased dramatically with technology advances, and the virtually ubiquitous nature of electronic communications. With this advancement, attention to data sanitization issues, practices, and procedures has become an important priority for entities. Data sanitization is the process of deliberately, permanently, and irreversibly removing or altering a record in a database. When software artifacts are moved back to a lower-level environment, the records associated with the software artifacts are sanitized prior to moving the data to the lower-level environment. In doing so, the records containing sensitive information is obscured from developers and coders who work on source code modules in the development environment, thereby protecting the customers' data privacy. However, in a distributed software development environment where software development is undertaken across multiple entity worksites or locations, some records may have inadvertently skipped the sanitization process. The present invention provides the functional benefit of continuously monitoring data movement between multiple environments to determine whether the sanitization level required for each environment has been met.

Figure 2:
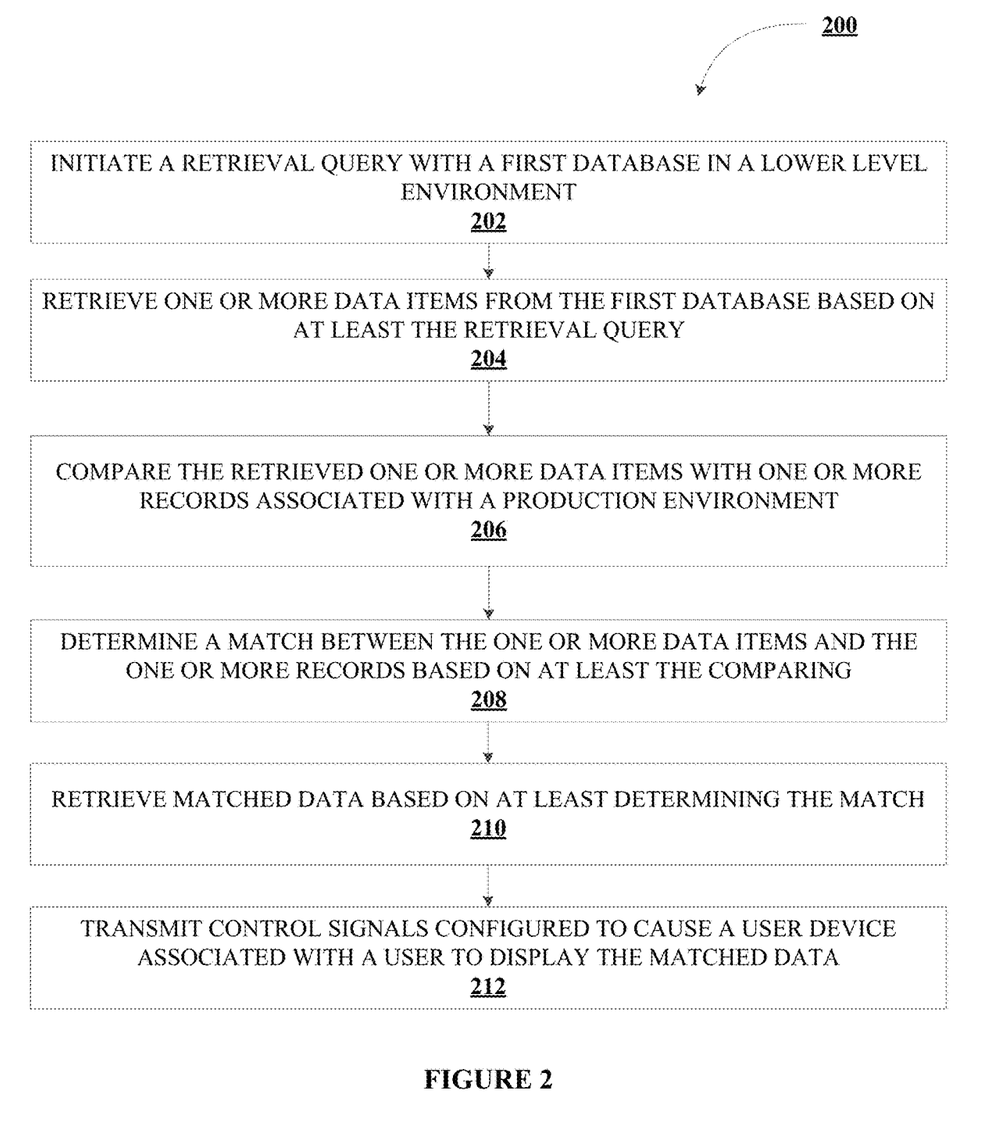
FIG. 2 illustrates a process flow for a system for monitoring lower level environment for unsanitized data.

FIG. 2 illustrates a process flow for monitoring lower level environment for unsanitized data 200, in accordance with an embodiment of the invention. As shown in block 202, the process flow includes initiating a retrieval query with a first database in a lower level environment. In some embodiments, the retrieval query is used to extract data items from the first database in a readable format according to the user's request. In one aspect, the retrieval query may be configured to access a specific data item in the first database, a specific column in the first database, a specific row in the first database, and/or a specific combination of data items, columns, and/or rows in the first database.

Data items are typically sanitized, using one or more sanitization algorithms, prior to being stored on the first database, i.e., prior to being moved from the production environment to lower level environments. In this regard, the system may be configured to retrieve one or more records from the production environment. In some embodiments, the one or more records may be categorized into one or more record types. These record types may be based on the location of the records in the database, the source of the records, i.e., the primary location from where the records are generated, size of the record, record dimensionality, a priority level associated with the record, a level of authentication required for a customer to access the record in the production environment, and/or the like. In response to retrieving the records from the production environment, the system may be configured to determine a record type associated with each of the records. Once the record type is determined, the system may then be configured to identify at least one of the one or more data sanitization algorithms to be implemented on the records. In some embodiments, the system may be configured to determine a combination of data sanitization algorithms based on the combination of record types associated with the records. For example, a first data sanitization algorithm may be capable of sanitizing records that are location in a specific location in the database, a second data sanitization algorithm may be capable of sanitizing records that are accessible to the customer after a successful two-part authentication. Once the sanitization algorithms have been identified, the system may then be configured to implement the one or more sanitization algorithms on the one or more records.

In some embodiments, the system may be configured to implement the sanitization algorithms on one or more data positions within each record. Certain records, while being sensitive as a whole, is virtually unrecognizable without specific portions in the records. Such specific portions are referred to herein as "restricted data items." For example, a social security number may be sanitized by replacing the first five data positions with and "X." In such cases, the system may be configured to identify specific locations of restricted data items, which when sanitized, will render the entire record unrecognizable. In one aspect, the specific positions of the restricted data items may be determined based on the record type. For example, while restricted data items for a social security number may be the first five data positions, the restricted data items for an account number may be the last five data positions. In response to identifying the position of one or more restricted data items, the system may be configured to implement at least one of the one or more sanitization algorithms on the position of the one or more restricted data items, thereby restricting access to the one or more records.

Next, the process flow includes retrieving one or more data items from the first database based on at least the retrieval query, as shown in block 204. Once the data items are retrieved, it is often desirable to store the data items locally by creating a registration that corresponds to the value of the data items, or the data items themselves, where they can be quickly and easily accessed. In some embodiments, the registration provides a reference so that the work items, or a portion thereof, may be subsequently retrieved. Local storage is a relative term depending upon the source of the information and can include many variations. For example, information retrieved over the Internet from a distant server could be storage locally in a server within a local network. In another example, information retrieved from a server on a local network could be stored locally on a user device. Once such example of local storage is a volatile or non-volatile cache memory.

Next, the process flow includes comparing the retrieved one or more data items with one or more records associated with the production environment, as shown in block 206. As discussed herein, the one or more data items in the lower level environment is sanitized and the one or more records in the production environment is unsanitized. In a software development environment with large amounts of data, the speed of comparison depends mostly on disk write speed, processor speed, memory, and the size of the databases. In some embodiments, when a comparison routine is executed, the system may be configured to store the data items retrieved from the lower level environment and the records retrieved from the production environment in a temporary memory location. In some embodiments, when comparing large amounts of data, the system may be configured to filter the retrieved data items and the records prior to executing the comparison routine.

Next, the process flow includes determining a match between the one or more data items and the one or more records based on at least comparing the one or more data items and the one or more records, as shown in block 208. In some embodiments, the system may be configured to compare the data items retrieved from the lower level environment and the records retrieved from the production environment in batches to determine the match. In this regard, the system may be configured to receive an indication that one or more additional data items have been added to the first database in the lower level environment. Once received, the system may then initiate the retrieval query with the first database to retrieve the one or more additional data items, and compare the one or more additional data items to the records associated with the production environment to determine the match.

In some embodiments, the system may be configured to initiate the retrieval query with the first database in the lower level environment at predetermined periodic intervals. In doing so, the system may determine one or more data items associated with the lower level environment that were not retrieved during the retrieval query initiated in a preceding period. In response, the system may be configured to compare the one or more data items that were not retrieved during the retrieval query initiated in the preceding period with the one or more records associated with the production environment to determine the match.

In some embodiments, a portion of the records in the production environment are sanitized and placed in a translation table associated with the lower level environment. When retrieving the one or more data items from the first database associated with the lower level environment, the system may be configured to first compare the data items retrieved from the first database with the portion of the records in the translation table to determine matched data. Any matched data determined based on this comparison is excluded from being compared with the one or more records associated with the production environment. The remaining data items retrieved from the first database that do not match the records in the translation table are then compared with the one or more records associated with the production environment to determine a match.

Next, the process flow includes retrieving the matched data based on at least determining the match between the remaining data items retrieved from the first database and the one or more records associated with the production environment, as shown in block 210. In some embodiments, the matched data indicates a presence of unsanitized data in the lower level environment, thus indicating a breach. In response to determining the match, the system may be configured to initiate a root cause analysis to determine a source of the breach. In doing so, the system may be configured to pinpoint the cause of the problem and then either automatically repair it or direct manual repair via a user. Root cause analysis determines, very specifically, the when, the where, and the why of a problem at its source, before it can ripple out to affect the end-user of an application or website a second time. In one aspect, the root cause analysis may begin by determining one or more devices that have accessed the first database during the predetermined past period. By determining the devices that accessed the first database, the system may be configured to diagnose which of the one or more devices were involved in the influx of unsanitized data from the production environment into the lower level environments. Once the devices are identified, the system may then reconfigure the identified devices to ensure that the devices do not cause or facilitate the influx of unsanitized data. In this regard, the system may be configured to reconfigure user authentication requirements to access the identified devices for continued use.

In some embodiments, the process flow includes transmitting control signals configured to cause a user device associated with a user to display the matched data, as shown in block 212. In some embodiments, the system may be configured to generate an alert based on at least determining the match. In one aspect, the alert comprises the matched data and the one or more device that have accessed the first database during the predetermined past period. In some embodiments, in addition to displaying the matched data, the system may be configured to automatically initiate a sanitization algorithm on the matched data to sanitize the data items that match the records. In another embodiment, the system may be configured to receive an indication from the user to initiate the sanitization algorithm on the matched data to sanitize the data items that match the records.

In one aspect, the system may be configured to determine whether the presence of matched data is acceptable in the lower level environment. In this regard, the system may be configured to receive from the user, an indication that the presence of matched data is acceptable and does not require additional analysis. In yet another aspect, the system may be configured to generate a history of one or more comparing instances and whether each comparing instance resulted in matched data. Such comparing instances may be color coded to distinguish between instances where matched data have been identified and instances where matched data have not been identified.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 8484US1.014033.3240 | To Be Assigned | INTEGRATED DATA PROVISIONING SYSTEM FOR APPLICATION DEVELOPMENT | Concurrently Herewith |
| 8485US1.014033.3241 | To Be Assigned | HOLISTIC AND SECURE RESOURCE PROVISIONING GATEWAY SYSTEM | Concurrently Herewith |
| 8487US1.014033.3242 | To Be Assigned | MONITORING DATA CONSUMPTION IN AN APPLICATION TESTING ENVIRONMENT | Concurrently Herewith |
| 8489US1.014033.3244 | To Be Assigned | SYSTEM FOR PROVISIONING VALIDATED SANITIZED DATA FOR APPLICATION DEVELOPMENT | Concurrently Herewith |

What is claimed is:

1. A system for monitoring lower level environment for unsanitized data, the system comprising:
   at least one non-transitory storage device; and
   at least one processing device coupled to the at least one non-transitory storage device, wherein the at least one processing device is configured to:
      continuously monitor data movement between a production environment and a development environment;
      receive an indication that one or more data items are moved from a production environment database in the production environment into a development environment database in the development environment;
      determine one or more data item types associated with the one or more data items moved from the production environment database based on at least a location of the one or more data items in the production environment database, source information associated with the one or more data items moved from the production environment database, size of the one or more data items moved from the production environment database, dimensionality of the one or more data items moved from the production environment database, a priority level associated with the one or more data items moved from the production environment database, and/or a level of authentication required for a user to access the one or more data items in the production environment;
      identify one or more sanitization algorithms to be implemented on the one or more data items moved from the production environment database based on at least the one or more data item types;
      implement the one or more sanitization algorithms on the one or more data items that are moved from the production environment database to the development environment database based on at least the one or more data item types associated with the one or more data items;
      generate a sanitized version of the one or more data items based on at least implementing the one or more sanitization algorithms;
      store the sanitized version of the one or more data items in the development environment database;
      initiate a retrieval query with the development environment database;
      retrieve the sanitized version of the one or more data items from the development environment database based on at least the retrieval query;
      compare the sanitized version of the one or more data items from the development environment database with the one or more data items that are moved from the production environment database;
      determine a match between the sanitized version of the one or more data items from the development environment database and the one or more data items moved from the production environment database based on at least the comparing;
      retrieve matched data based on at least determining the match, wherein the matched data indicates a presence of unsanitized data in the development environment indicating a breach; and
      transmit control signals configured to cause a user device associated with a user to display the matched data.

2. The system of claim 1, wherein the at least one processing device is further configured to:
   retrieve the one or more data items from the production environment database; and
   implement one or more sanitization algorithms on the one or more data items.

3. The system of claim 2, wherein the at least one processing device is further configured to:
   identify a position of one or more restricted data items associated with the one or more data items moved from the production environment database; and
   implement at least one of the one or more sanitization algorithms on the position of the one or more restricted data items, thereby restricting access to the one or more data items in the production environment database.

4. The system of claim 1, wherein the at least one processing device is further configured to:
   implement a root cause analysis to determine a source of the breach, wherein implementing further comprises determining one or more devices that have accessed the development environment database during a predetermined past period.

5. The system of claim 4, wherein the at least one processing device is further configured to:
   generate an alert based on at least determining the match, wherein the alert comprises the matched data and the one or more devices that have accessed the development environment database during the predetermined past period.

6. The system of claim 1, wherein the at least one processing device is further configured to:
   receive an indication that one or more additional data items have been added to the development environment database;
   initiate the retrieval query with the development environment database to retrieve the one or more additional data items based on at least receiving the indication that the one or more additional data items have been added to the development environment database; and
   compare the one or more additional data items to the one or more data items associated with the production environment to determine the match.

7. The system of claim 1, wherein the at least one processing device is further configured to:
   automatically initiate the retrieval query with the development environment database at predetermined periodic intervals;
   determine one or more data items associated with the development environment that were not retrieved during the retrieval query initiated in a preceding period; and
   compare the one or more data items that were not retrieved during the retrieval query initiated in the preceding period with the one or more data items associated with the production environment database to determine the match.

8. A computer implemented method for monitoring lower level environment for unsanitized data, the method comprising:
   continuously monitoring data movement between a production environment and a development environment;
   receiving an indication that one or more data items are moved from a production environment database in the production environment into a development environment database in the development environment;
   determining one or more data item types associated with the one or more data items moved from the production environment database based on at least a location of the one or more data items in the production environment database, source information associated with the one or more data items moved from the production environment database, size of the one or more data items moved from the production environment database, dimensionality of the one or more data items moved from the production environment database, a priority level associated with the one or more data items moved from the production environment database, and/or a level of authentication required for a user to access the one or more data items in the production environment;

identifying one or more sanitization algorithms to be implemented on the one or more data items moved from the production environment database based on at least the one or more data item types;

implementing the one or more sanitization algorithms on the one or more data items that are moved from the production environment database to the development environment database based on at least the one or more data item types associated with the one or more data items;

generating a sanitized version of the one or more data items based on at least implementing the one or more sanitization algorithms;

storing the sanitized version of the one or more data items in the development environment database;

initiating a retrieval query with the development environment database;

retrieving the sanitized version of the one or more data items from the development environment database based on at least the retrieval query;

comparing the sanitized version of the one or more data items from the development environment database with the one or more data items in the production environment database;

determining a match between the sanitized version of the one or more data items from the development environment database and the one or more data items in the production environment database based on at least the comparing;

retrieving matched data based on at least determining the match, wherein the matched data indicates a presence of unsanitized data in the development environment indicating a breach; and transmitting control signals configured to cause a user device associated with a user to display the matched data.

9. The method of claim 8, wherein the method further comprising:

retrieving the one or more data items from the production environment database; and implementing one or more sanitization algorithms on the one or more data items.

10. The method of claim 9, wherein the method further comprising:

identifying a position of one or more restricted data items associated with the one or more data items moved from the production environment database; and implementing at least one of the one or more sanitization algorithms on the position of the one or more restricted data items, thereby restricting access to the one or more data items in the production environment database.

11. The method of claim 8, wherein the method further comprising:

implementing a root cause analysis to determine a source of the breach, wherein implementing further comprises determining one or more devices that have accessed the development environment database during a predetermined past period.

12. The method of claim 11, wherein the method further comprising:

generating an alert based on at least determining the match, wherein the alert comprises the matched data and the one or more devices that have accessed the development environment database during the predetermined past period.

13. The method of claim 8, wherein the method further comprising:

receiving an indication that one or more additional data items have been added to the development environment database;

initiating the retrieval query with the development environment database to retrieve the one or more additional data items based on at least receiving the indication that the one or more additional data items have been added to the development environment database; and comparing the one or more additional data items to the one or more data items associated with the production environment to determine the match.

14. The method of claim 8, wherein the method further comprising:

automatically initiating the retrieval query with the development environment database at predetermined periodic intervals;

determining one or more data items associated with the development environment that were not retrieved during the retrieval query initiated in a preceding period; and comparing the one or more data items that were not retrieved during the retrieval query initiated in the preceding period with the one or more data items associated with the production environment database to determine the match.

15. A computer program product for monitoring lower level environment for unsanitized data, the computer program product comprising a non-transitory computer-readable medium comprising code causing a first apparatus to:

continuously monitor data movement between a production environment and a development environment;

receive an indication that one or more data items are moved from a production environment database in the production environment into a development environment database in the development environment;

determine one or more data item types associated with the one or more data items moved from the production environment database based on at least a location of the one or more data items in the production environment database, source information associated with the one or more data items moved from the production environment database, size of the one or more data items moved from the production environment database, dimensionality of the one or more data items moved from the production environment database, a priority level associated with the one or more data items moved from the production environment database, and/or a level of authentication required for a user to access the one or more data items in the production environment;

identify one or more sanitization algorithms to be implemented on the one or more data items moved from the production environment database based on at least the one or more data item types;

implement the one or more sanitization algorithms on the one or more data items that are moved from the production environment database to the development environment database based on at least the one or more data item types associated with the one or more data items;
generate a sanitized version of the one or more data items based on at least implementing the one or more sanitization algorithms;
store the sanitized version of the one or more data items in the development environment database;
initiate a retrieval query with the development environment database;
retrieve the sanitized version of the one or more data items from the development environment database based on at least the retrieval query;
compare the sanitized version of the one or more data items from the development environment database with the one or more data items in the production environment database;
determine a match between the sanitized version of the one or more data items from the development environment database and the one or more data items in the production environment database based on at least the comparing;
retrieve matched data based on at least determining the match, wherein the matched data indicates a presence of unsanitized data in the development environment indicating a breach; and
transmit control signals configured to cause a user device associated with a user to display the matched data.

16. The computer program product of claim 15, wherein the first apparatus is further configured to:
retrieve the one or more data items from the production environment database; and
implement one or more sanitization algorithms on the one or more data items.

17. The method of claim 8, wherein the method further comprises:
retrieving the one or more data items from the production environment database; and
implementing one or more sanitization algorithms on the one or more data items.

* * * * *